United States Patent
Reghezza et al.

(10) Patent No.: US 8,734,103 B2
(45) Date of Patent: May 27, 2014

(54) METHOD OF REPAIRING A FLANGE OF A CASING

(75) Inventors: Patrick Jean-Louis Reghezza, Vaux le Penil (FR); Julien Tran, Pontoise (FR)

(73) Assignee: SNECMA, Paris (FR)

( * ) Notice: Subject to any disclaimer, the term of this patent is extended or adjusted under 35 U.S.C. 154(b) by 433 days.

(21) Appl. No.: 13/149,133

(22) Filed: May 31, 2011

(65) Prior Publication Data

US 2011/0293409 A1    Dec. 1, 2011

(30) Foreign Application Priority Data

Jun. 1, 2010  (FR) ...................................... 10 54260

(51) Int. Cl.
*F03B 11/00* (2006.01)

(52) U.S. Cl.
USPC ...................... 415/215.1; 415/200; 29/402.12; 29/889.1; 29/402.04

(58) Field of Classification Search
USPC .............. 29/889.1, 898.01, 402.01, 402.04, 29/402.09, 402.12, 402.14, 402.19; 415/170.1, 214.1, 215.1, 200, 213.1, 415/182.1
See application file for complete search history.

(56) References Cited

U.S. PATENT DOCUMENTS

| | | | |
|---|---|---|---|
| 5,033,938 A * | 7/1991 | Fraser et al. .................. | 416/224 |
| 5,203,066 A | 4/1993 | McDonald | |
| 7,722,318 B2 * | 5/2010 | Addis ........................... | 415/148 |
| 2008/0099446 A1 | 5/2008 | Belanger | |
| 2008/0193280 A1 | 8/2008 | Addis | |
| 2009/0064500 A1 | 3/2009 | Reynolds et al. | |

FOREIGN PATENT DOCUMENTS

| | | |
|---|---|---|
| EP | 1 916 051 A1 | 4/2008 |
| EP | 1 959 094 A2 | 8/2008 |
| EP | 1 977 852 A1 | 10/2008 |

OTHER PUBLICATIONS

French Preliminary Search Report issued Dec. 17, 2010, in French 1054260, filed Jun. 1, 2010 (with English Translation of Category of Cited Documents).

* cited by examiner

*Primary Examiner* — Ned Landrum
*Assistant Examiner* — Justin Seabe
(74) *Attorney, Agent, or Firm* — Oblon, Spivak, McClelland, Maier & Neustadt, L.L.P.

(57) ABSTRACT

A method of repairing a flange of a casing for an airplane turboprop or turbojet, in which the flange includes at least one through hole for passing a bolt for fastening equipment, and the hole opens out in a face of the flange that is worn by friction against the equipment, disclosed. The method includes mounting a bearing member on the flange. The bearing member includes a radial wall covering the worn face of the flange. The wall includes a hole that comes into register with the hole in the flange and having thickness for compensating the wear of the face of the flange. The member further includes an abutment for bearing against the periphery of the flange, and being fastened to the flange by adhesive.

11 Claims, 2 Drawing Sheets

METHOD OF REPAIRING A FLANGE OF A CASING

FIELD OF THE INVENTION

The present invention relates to a method of repairing a flange of a casing, e.g. made of aluminum, for a turbomachine such as an airplane turboprop or turbojet.

BACKGROUND OF THE INVENTION

While a turbojet is in operation, the casings are subjected to vibration that may lead to damage in the long run. By way of example, a low pressure compressor casing includes a flange that serves in particular to have equipment fastened thereto and that includes numerous holes for passing bolts.

The mechanical stresses in the vicinity of these holes, caused by the vibration of the casing, give rise to damage by hammering of the inside surfaces of the holes and of the plane surface of the flange against which the equipment or the equipment support bears. Localized wear is thus observed in the surface of the flange that comes into contact with the equipment or the equipment support, accompanied by an increase in the diameter of the hole and ovalization of the section of the hole.

In order to ensure proper operation of the turbomachine, it is necessary either to repair this damage, or else to change the casing completely, it being understood that the average cost thereof is very high.

In order to repair such damage, it is known to add material by welding so as to reconstruct the original shape of the holes and the surface of the flange against which the equipment or the equipment support comes to bear.

Nevertheless, when casings are made of aluminum or of composite material, and more generally out of any non-weldable material, such a method cannot be used. As an alternative, material may be applied using a fiberglass-filled epoxy resin. That technique is used to restore the original shape to holes, but it cannot be used for repairing the damaged zone of the surface of the flange against which the equipment bears. The compression strength of such resin is not sufficient to guarantee a rigid interface with the equipment assembled on the flange. Furthermore, when the bolts are tightened, only the undamaged portion of the flange is capable of withstanding the compression forces. Since the undamaged bearing surface is reduced, the hammering and wear pressure on the flange are increased. Thus, even after holes have been repaired, it might still be necessary to change the casing, as a result of excessive wear of said flange surface.

Furthermore, such a repair cannot be performed during an under-the-wing maintenance operation, but on the contrary it requires the entire engine to be removed.

It should also be observed that regulations ban the fitting of additional parts to a certified configuration.

Patent application FR 10/00555 in the name of the Applicant and not yet published describes a method of repair that consists in machining a spot face in the worn zone of the flange and then adhesively bonding a washer on the spot face.

Nevertheless, such a spot face and such a washer are not suitable for all types of flange. In particular, depending on the shape of the flange, the diameter of the washer sometimes needs to be small, thereby limiting the strength of the resulting interface with the equipment or the equipment support.

OBJECT AND SUMMARY OF THE INVENTION

A particular object of the invention is to provide a solution to this problem that is simple, effective, and inexpensive.

To this end, the invention provides a method of repairing a flange of a casing, e.g. made of aluminum, for a turbomachine such as an airplane turboprop or turbojet, the flange including at least one through hole for passing a bolt for fastening equipment, the hole opening out in a face of the flange that has become worn by friction against the equipment, wherein the method consists in mounting a bearing member on the flange, the bearing member having a wall that extends radially for covering the worn face of the flange and for forming a bearing surface for the equipment that is to be fastened to the flange, said wall including at least one hole coming into register with the through hole in the flange and presenting thickness suitable for compensating the wear of the face of the flange, said member also including a positioning abutment that bears against the radially outer periphery of the flange, said member subsequently being fastened on the flange, the flange having festoons, each formed with a through hole for passing a fastener bolt, the bearing member having the general shape of one or more consecutive festoons, and including a radially outer rim with at least one central zone forming the positioning abutment, and with two curved or oblique zones on either side thereof extending radially inwards.

The shape of the bearing member is thus perfectly matched to the shapes of the flange and of the worn zone of the flange, thereby enabling it to form a bearing surface for equipment that is of area that is greater than that of a washer on its own. Such a member is thus suitable for withstanding large forces.

Furthermore, the positioning abutment facilitates positioning and mounting the member on the flange.

According to a characteristic of the invention, the bearing member is fastened to the flange by adhesive, e.g. using a fiberglass-filled epoxy resin.

Such a resin provides good adhesion with anodized aluminum and with the bearing member, and it does not give rise to corrosion of the material of the flange.

According to a possibility of the invention, the curved or oblique zones of the bearing member are spaced apart from corresponding zones of the festoon of the flange, the space formed in this way serving to receive adhesive.

Preferably, a setback for receiving the bearing member is machined in the worn face of the flange prior to mounting the bearing member, the machining being performed, for example, by milling or by belt-grinding.

This machining serves in particular to make surfaces that are plane and to match the depth of the setback so that, after assembly, the bearing surface of the member that is to receive the equipment is itself properly positioned.

In a preferred embodiment of the invention, the bearing member is made by folding or stamping a metal sheet of thickness lying in the range 0.8 millimeters (mm) to 1 mm.

Advantageously, the bearing member is made of a material presenting hardness that is greater than that of the material of the flange so as to better withstand the hammering stresses in the contact zone between the equipment or the equipment support and the bearing member.

The invention also provides a bearing member for repairing a flange of a casing using the above-described method, wherein the method comprises a bearing wall in the shape of one or more consecutive festoons, each festoon presenting a hole, and a rim extending from an outer edge of the bearing wall and having at least one central zone for forming a positioning abutment, with two curved or oblique zones on either side thereof extending radially inwards.

According to a characteristic of the invention, the bearing wall presents at least two consecutive festoons.

Preferably, it is made of an alloy based on nickel or on steel.

BRIEF DESCRIPTION OF THE DRAWINGS

The invention can be better understood and other details, characteristics, and advantages of the invention appear on reading the following description made by way of non-limiting example and with reference to the accompanying drawings, in which.

MORE DETAILED DESCRIPTION

Figure 1:
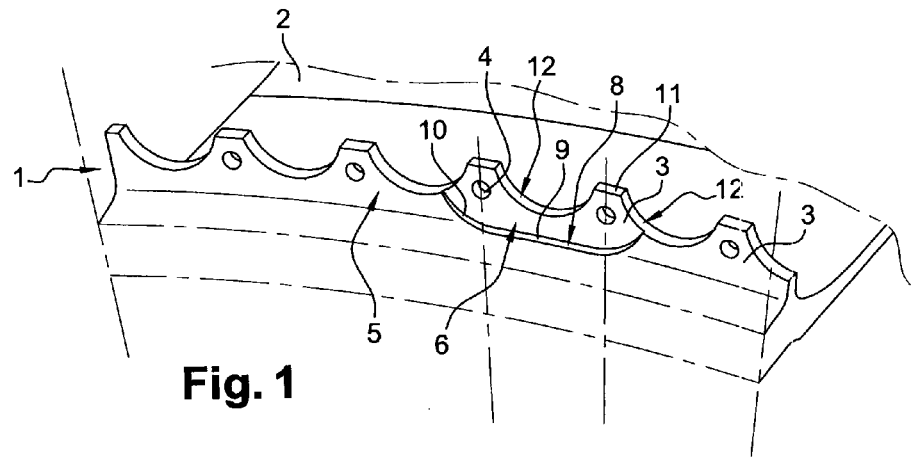
FIG. 1 is a perspective view of a portion of a turbojet casing including a flange in which a worn zone has been machined.
Figure 2:
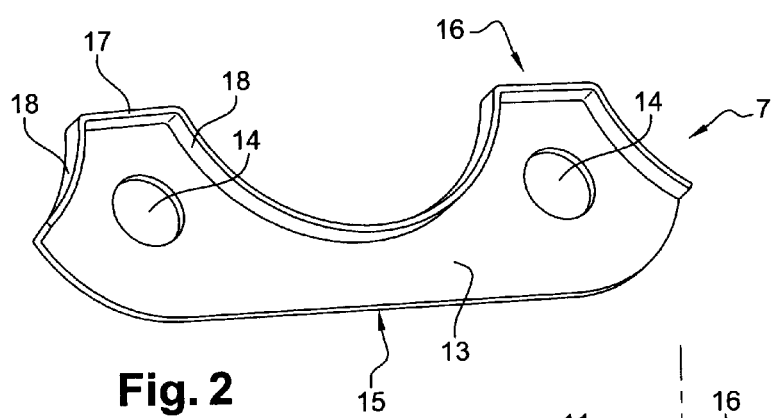
FIG. 2 is a perspective view of a bearing member.
Figure 3:
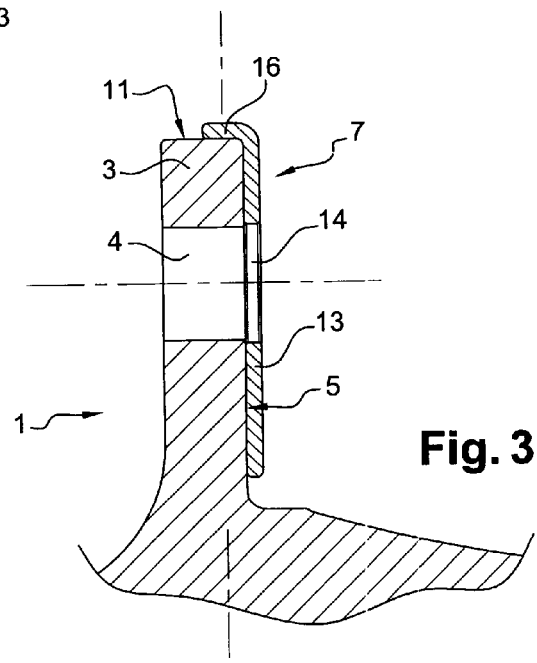
FIG. 3 is a section view on line of FIG. 5, showing the mounting of a bearing member on the flange.
Figure 4:
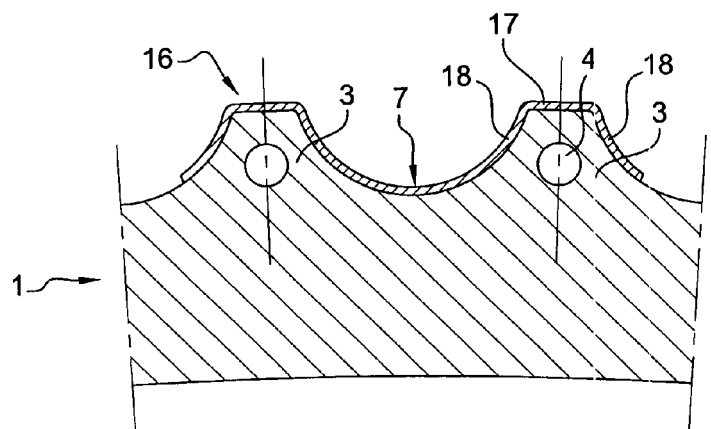
FIG. 4 is a section view on line IV-IV of FIG. 3, showing such a mounting.

FIG. 1 shows a so-called "festooned" annular flange 1 of an aluminum casing 2 of a low pressure compressor of a turbojet, which flange has been damaged by the mechanical stresses generated during operation of the turbojet.

The flange 1 comprises a series of successive festoons 3, each having a hole 4 that opens out into opposite main faces 5 of the flange. The holes 4 are used for passing bolts for fastening stiffeners or other equipment.

In operation, vibration of the casing 2 generates damage by hammering on the inside surfaces of the holes 4 and on one of the main faces 5 of the flange 1 against which the equipment bears. Localized wear is thus observed of the face 5 of the flange 1, in the zone of contact between the flange 1 and the equipment, together with an increase in the diameter of the hole 4 and/or ovalizing of the section of said hole 4.

In order to repair the flange 1 of the casing 2, the invention proposes machining a setback 6 in the worn face 5 of the flange 1 by milling or by belt-grinding so as to make it possible to fasten a bearing member 7 therein.

In the example of FIG. 1, the setback 6 extends over two successive festoons 3 and presents a radially inner edge 8 having a central portion 9 running along the radially inner edge of the flange 1 and terminating in two rounded concave ends 10 that are substantially circularly arcuate.

Each festoon 3 has a radially outer edge presenting a generally plane central zone 11 with two curved or oblique zones 12 extending radially inwards from either side thereof.

The bearing member 7 is fastened to the flange 1 by adhesive, e.g. using a fiberglass-filled epoxy resin. The resin used is preferably that sold by the supplier Henkel under the reference Hysol EA9394.

The bearing member, shown in FIGS. 2 to 6, comprises a wall 13 that extends radially, for covering the worn and machined face 5 of the flange 1 and for forming a bearing surface for the equipment that is to be fastened to the flange 1.

The wall 13 is in the form of two consecutive festoons and it includes two holes 14 that come into register with the holes 4 in the flange 1, the wall 13 having a thickness suitable for compensating the wear of the face 5 of the flange 1. The bottom edge 15 of the wall 13 is of a shape that corresponds to the bottom edge 8 of the setback 6 in the flange 1.

The bearing member 7 also includes a radially-outer circumferential rim 16 extending perpendicularly to the face 13 and in the form of two consecutive festoons, each festoon having a rectilinear central zone 17 forming a positioning abutment that is to bear against the central zone 11 of the corresponding festoon 3 of the flange 1, and two curved or oblique zones 18 on either side thereof that extend radially inwards.

The curved or oblique zones 18 of the bearing member 7 are spaced apart from the corresponding zones 12 of the festoon 3 of the flange 1, with the space or clearance as formed in this way serving to receive adhesive.

The bearing member 7 is made by folding or stamping a sheet of metal alloy based on nickel or steel, e.g. an A286 type alloy, having thickness lying in the range 0.8 mm to 1 mm. The bearing member 7 is thus made of a material that is harder than the material of the flange 1. The thickness of the sheet, and thus of the bearing wall 13 is a function of the wear of the flange 1.

The bearing member 7 forms a rigid bearing surface that is secured to the casing 2 for the equipment or the equipment support, and it serves to centralize bolts relative to the holes 4 in the flange.

The equipment or the equipment support may then bear against the bearing member 7, which is capable of withstanding compression forces while the bolts are being tightened, and which enables the bolts to be centered relative to the holes 4 in the flange.

Such a repair is inexpensive, fast, and capable of being performed directly during an under-the-wing maintenance operation, it not being necessary to remove the engine.

Since the bearing member 7 is secured to the casing 2, it is not considered as being an additional part distinct from the casing 2, and therefore complies with regulations.

It should also be observed that the method makes it possible, after making a repair, to use bolts that are identical to those that were in use before making the repair.

In the embodiment shown in the drawings, the bearing member 7 is in the form of two successive festoons 3, so as to cover the entire area of the worn zone. Naturally, depending on the zone that is worn and used, the bearing member 7 could equally well extend over a single festoon or over more than two festoons. The bearing member 7 could equally well present other shapes, depending on the shape of the flange.

A major advantage of the invention is that the thickness of the face 13 of the bearing member and the depth of the setback formed by machining the worn face of the flange are determined so that the bearing member when fastened on the flange exactly compensates for the wear of the face 5 of the flange. Thus, equipment fastened to the flange via the bearing member 7 remains in exactly the same axial position that it occupied on initial assembly on the flange, which is essential for proper operation thereof and avoids any need to perform additional adjustments or modifications.

What is claimed is:

1. A method of repairing a flange of a casing for a turbomachine, the flange including at least one through hole for passing a bolt for fastening equipment, the hole opening out in a face of the flange that has become worn, the method comprising:

machining a setback in the worn face of the flange;

mounting a bearing member on the flange, the bearing member having a wall that extends radially for covering the worn face of the flange and for forming a bearing surface for the equipment that is to be fastened to the flange, said wall including at least one hole coming into register with the through hole in the flange and presenting thickness suitable for compensating the wear of the face of the flange, said member further including a positioning abutment that bears against and covers at least a portion of a radially outer periphery of the flange; and fastening said member on the flange, the flange having festoons, each festoon formed with the through hole for passing the fastener bolt, the bearing member having a general shape of one or more consecutive festoons, and including a radially outer rim with at least one central zone forming the positioning abutment, and with two curved or oblique zones on either side thereof extending radially inwards.

2. A method according to claim 1, wherein the bearing member is fastened to the flange by adhesive.

3. A method according to claim 2, wherein the bearing member is fastened to the flange by a fiberglass-filled epoxy resin.

4. A method according to claim 1, wherein the curved or oblique zones of the bearing member are spaced apart from corresponding zones of the festoon of the flange.

5. A method according to claim 1, wherein the setback is machined in the worn face of the flange by milling or by belt-grinding.

6. A method according to claim 1, wherein the bearing member is made by folding or stamping a metal sheet of thickness lying in the range 0.8 mm to 1 mm.

7. A method according to claim 1, wherein the bearing member is made of a material presenting hardness that is greater than that of the material of the flange.

8. A bearing member for repairing a flange of a casing, wherein the member comprises a bearing wall in the shape of one or more consecutive festoons, each festoon presenting a hole, and a rim extending from an outer edge of the bearing wall and having at least one central zone for forming a positioning abutment which bears against and covers at least a portion of a radially outer periphery of the flange, with two curved or oblique zones on either side thereof extending radially inwards.

9. A bearing member according to claim 8, wherein the bearing wall presents at least two consecutive festoons.

10. A bearing member according to claim 8, comprising an alloy based on nickel or on steel.

11. A method according to claim 1, wherein the casing comprises aluminum.

* * * * *

UNITED STATES PATENT AND TRADEMARK OFFICE
CERTIFICATE OF CORRECTION

| | |
|---|---|
| PATENT NO. | : 8,734,103 B2 |
| APPLICATION NO. | : 13/149133 |
| DATED | : May 27, 2014 |
| INVENTOR(S) | : Patrick Jean-Louis Reghezza et al. |

It is certified that error appears in the above-identified patent and that said Letters Patent is hereby corrected as shown below:

In the Specification

Figure 5:
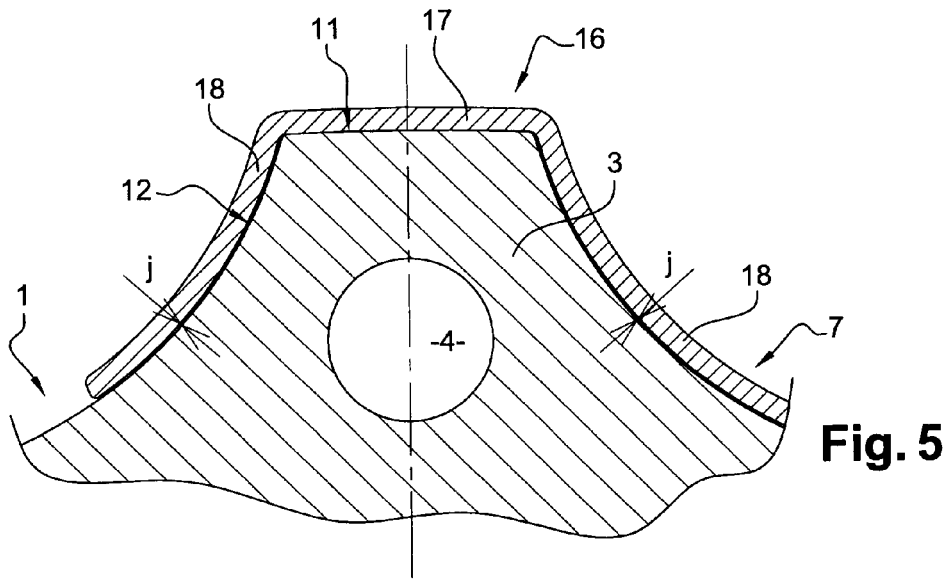
FIG. 5 is a view on a larger scale of a festoon of the flange and of the bearing member.
Figure 6:
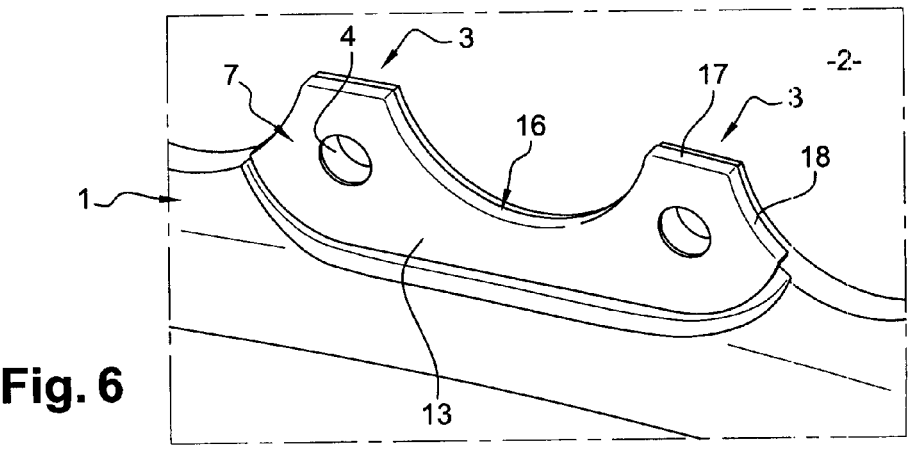
FIG. 6 is a perspective view of the bearing member mounted on the flange.

Col. 3, line 11, change "line of Fig. 5" to --line III-III of Fig. 5--.

Signed and Sealed this
Fourteenth Day of October, 2014

Michelle K. Lee
*Deputy Director of the United States Patent and Trademark Office*